3,392,010
RECOVERY OF METAL VALUES
Virgil L. Hansley, Cincinnati, and Harold H. Morse, Mariemont, Ohio, assignors to National Distillers and Chemical Corporation, New York, N.Y., a corporation of Virginia
No Drawing. Continuation-in-part of application Ser. No. 8,238, Feb. 12, 1960. This application June 6, 1962, Ser. No. 200,334
19 Claims. (Cl. 75—66)

This application is a continuation-in-part of Ser. No. 8,238, filed Feb. 12, 1960, and now abandoned.

This invention relates to a novel process for the separation of cesium values from ores and, more particularly, to the direct extraction of cesium metal and cesium-rich alkali metal mixtures thereof from pollucite ore.

Heretofore, cesium has been recovered from pollucite ore by elaborate and expensive procedures, such as, for example, by digesting the finely ground ore with strong hydrochloric acid and then treating the resultant solution with a solution of antimony trichloride to precipitate the cesium as a complex chloride.

It is an object of this invention to provide a novel, simple, and economical process for the production of cesium metal and cesium-rich alkali metal mixtures. It is a further object of this invention to produce cesium metal and cesium-rich alkali metal mixtures by direct extraction from pollucite ore. Other objects will become apparent from the following description.

It has now been found that cesium may be extracted simply and economically from pollucite ore in accordance with the present invention by powdering and calcining the ore and then treating it with an alkali metal lower than cesium in volatility.

In general, this invention comprises a process for the production of cesium and cesium-alkali metal mixtures which is characterized by reacting pollucite ore with an alkali metal other than cesium. More particularly, the process of this invention comprises the steps of grinding the ore, calcining it at about 1200° to 1700° F. to remove water and other volatiles, and then heating the ground, calcined ore with sodium at a temperature below the boiling point of sodium, i.e., about 1622° F., and above the boiling point of cesium, i.e., about 1238° F. The preferred reaction temperature is within the range of about 1382° to 1562° F.

Although this invention will be described primarily with regard to the extraction of cesium from pollucite ore by heating with sodium, it will be understood that the process may be applied to the extracting of cesium by heating the ore with other alkali metals. Pollucite, a natural ore of cesium, which can be represented by the general formula $Cs_2O \cdot Al_2O_3 \cdot 5SiO_2 \cdot H_2O$, generally contains about 30–35 percent of cesium on a water-free basis, the cesium-content of the ore never running as high as the pure formula would indicate, i.e., about 40 percent. Since cesium is the most volatile of the alkali metals, all others, i.e., lithium, sodium, potassium, and rubidium, can serve as "reducing agents" in this invention. The use of sodium is, however, preferred. The reaction temperature will be above the boiling point of cesium and below the boiling point of the selected alkali metal.

In practice of this invention the starting ore is ground to a powder in conventional grinding equipment. Although the particle size of the ground ore is not critical, a mesh size of about 100 to 200 mesh has been found to be satisfactory. The ground ore is then calcined at temperatures of about 1200° F. to 1700° F. to remove water and volatiles and then placed in a reaction zone where it is treated with sodium. The extraction of cesium itself from the ore will take place with a stoichiometric quantity of sodium, but since other materials tend to reduce slightly (for example, small amounts of silicon are formed), an excess of sodium is generally used. It has been found practical to operate with a quantity by weight of sodium equivalent to between 1 and 4 and preferably between 1 and 2, times that of cesium in the pollucite ore.

The ground, calcined ore and the sodium are then heated at a temperature between about 1230° and 1630° F., whereupon cesium together with some sodium volatilizes from the mixture and is condensed to a liquid at about 212° F. Upon cooling to room temperature, a two-phase product results. The liquid phase of the product contains about 75 to 95 percent cesium, M.P. −20° to −30° C. (pure cesium melts at +28° C.), and about 5 to 25 percent sodium. This composition has been found to have many applications; for example, it is useful as a coolant in atomic reactors and as a heat exchange medium. In addition, it is possible to recover pure cesium quantitatively by fractional distillation of the cesium from the other alkali metals present in the product mixtures.

The solid phase which separates upon cooling from the volatilized metal mixture without fractionation and which has a low cesium content, e.g., about 15 to 50 percent, may be recycled and contacted with additional sodium and fresh pollucite and treated to recover more cesium.

For optimum cesium recovery and for ease in slag removal, both grinding and calcining of the ore prior to reduction with an alkali metal have been found to be essential. When ground ore is used without calcining, the sodium efficiency is lowered because of the formation of caustic soda by the reaction of the sodium and the water of hydration of the ore. Also considerable frothing and boiling result, which retard the reaction rate during reduction. Moreover, in batch operations the slag remaining when calcined ore is used is much more easily removed from the reactor than when ore containing the free and combined moisture normal in the original pollucite is used. This is due apparently to the formation of molten caustic soda which causes the particles of slag to adhere to the side walls of the vessel. It is, therefore, necessary to calcine the ground ore prior to treating it with alkali metal; this may be accomplished effectively by exposing the ground ore to temperatures of about 1200° to 1700° F., thus removing the water of hydration and volatiles and resulting in more uniform and easily handled reactions.

In order to attain maximum yields of cesium, it is also necessary to minimize the contact time of the ore with the reducing alkali metal and with the cesium product. It is known that alkali metals may reduce aluminum compounds and silicon compounds. Thus, prolonged contact time will cause a recombination of the liberated cesium or of the reducing alkali metal with certain of the ore constituents. For example, the cesium or the sodium may react with the aluminum and/or with the silicon components to produce lower valent aluminum compounds and/or elemental silicon. Preferred operation, therefore, involves rapid reduction of the pollucite ore and the removal of the cesium from the reaction zone as fast as it is formed. To achieve this, an excess of sodium is employed, generally up to about two or more times the theoretical amount required to release the cesium from the ore. It has also been found advantageous to lower the cesium ore contact time by first preparing a mixture of sodium and ground, calcined ore and then quickly elevating the temperature of the reaction mass to above the boiling point of cesium, i.e., 1238° F., causing a rapid evolution and discharge of the cesium and reducing the possibility of recombination or reduction of the silicates by cesium.

The reduction reaction generally is carried out at a pressure between about 10 and 15 p.s.i.a. While operation at lower pressures, i.e., down to about 1 p.s.i.a., has little or no effect on the final recovery, it has been found to cause rapid removal of the cesium as formed, thus reducing the overall operating time approximately to 40 percent with consequent reduction in power requirements. It has also been noted that slag from runs made at reduced pressure from calcined ore is powderlike and can be discharged very easily from the reactor.

The process may be batchwise, semi-continuous, or continuous. For example, calcined pollucite ore and sodium may be charged continuously to the reaction mass while the cesium-sodium vapor mixture is being continuously flashed off and separately fractionated to provide a pure cesium fraction.

The extraction of cesium preferably takes place in an inert atmosphere, for example, in an atmosphere of nitrogen, helium, argon, neon, and the like, or a mixture thereof.

The invention is described further by means of the following examples which are illustrative only and are not intended to limit the invention. All quantities are given as parts by weight unless otherwise indicated.

In Examples I through IX the starting pollucite ore was broken down in a jaw crusher to particles approximately ¼″ in diameter and then further comminuted in a mill grinder to 100 to 200 mesh. After having been ground, the ore was charged to an open top calciner pot suspended in an electric furnace. The temperature of the bed in the calciner was maintained at 1700° F. for 24 hours to remove all free and combined water. The hot calcined ore was again passed through the mill grinder to reduce any agglomerates formed during heating and then stored in sealed drums until used.

EXAMPLE I

Ground, calcined pollucite ore (112.5 parts) was charged at ambient temperature to a reactor containing 58 parts of brick sodium. The reactor was sealed and then heated to 1225° F. in an atmosphere of argon to initiate reduction. The temperature was then increased to 1630° F. The average pressure throughout the reaction was 15 p.s.i.a. After a 10-hour reaction period, the volatile metal, which distilled off and was condensed during this period, was cooled to room temperature. It was found to consist of two phases: (1) approximately 70 percent of the cesium was separated as a liquid composed of 90 percent cesium–9 percent sodium–1 percent other alkali metals (chiefly rubidium and potassium) and (2) the solid, higher-melting alloy which was approximately a 50–50 mixture of cesium and sodium. Pure cesium, 22.58 parts (80.3 percent, based on the cesium assay of the ore), was recovered by fractionating the two combined product phases.

EXAMPLE II

The procedure of Example I was repeated except that the initial reaction temperature was 990° F., the final reaction temperature was 1595° F., and the reaction time was 12.5 hours. The yield was 26.37 parts of cesium, or 93.5 percent.

EXAMPLE III

A reactor similar to that in Example I was equipped with a packed tower and air-cooled reflux exchanger at the vapor discharge nozzle. Ground, calcined pollucite ore (150 parts) and brick sodium (75 parts) were charged to the reactor. The reactor was heated to 1255° F in an atmosphere of argon to initiate reduction. The temperature was then increased to 1580° F. Average pressure throughout the reaction was 15 p.s.i.a. The reflux exchanger was adjusted to give a reflux ratio of 20:1 throughout the reaction period. After 11.0 hours' reaction time, no further distillation of product occurred. The distillate contained 22.3 parts (59.4 percent yield) of cesium as 95 to 99 percent pure material. Consequently, while the recovered product was of very high purity, the yields were low due to the side reaction of the refluxing cesium with the silicon and aluminum oxide in the pollucite ore.

EXAMPLE IV

The procedure of Example I was repeated except that the initial reaction temperature was 630° F., the final reaction temperature was 1610° F., the average reaction pressure was 7 p.s.i.a., and the reaction time was 9.75 hours. The yield was 25.9 parts of cesium, or 92.0 percent.

EXAMPLE V

The procedure of Example I was repeated except that the initial reaction temperature was 500° F., the final reaction temperature was 1400° F., the average reaction pressure was 1 p.s.i.a., and the reaction time was 5.0 hours. The yield was 22.5 parts of cesium, or 80.0 percent.

EXAMPLE VI

To illustrate reduction with recycle metal, the procedure of Example I was repeated using as the reactor charge 150 parts of ground, calcined pollucite ore, 75 parts of brick sodium, and the distillation residue from a previous run containing 54 parts sodium and 12 parts cesium. Initial reaction temperature was 1100° F., final reaction temperature 1520° F., average reaction pressure 15 p.s.i.a., and reaction time 9.5 hours. The yield was 40.7 parts of cesium, or 82.5 percent, based on the total amount of cesium charged to the reactor.

EXAMPLE VII

To determine the effect of incremental pollucite ore feed, 28 parts of sodium was charged to a reactor equipped with a nitrogen-blanketed feed hopper with a feed screw. Calcined pollucite ore (50 parts) was charged continuously from the feed bin to the reaction mass. The initial temperature was 1445° F., and the temperature was increased as necessary to provide a continuous discharge of cesium vapor, the final reaction temperature being 1545° F. The reaction time was 6.0 hours. The yield was 6.05 parts of cesium, or 47.8 percent.

EXAMPLE VIII

To determine the effect of incremental sodium feed, 462.5 parts of pollucite ore was charged to the reduction vessel and heated to 700° F. Sodium was added at a feed rate of 12 parts per hour to start the reaction. The bed temperature was increased gradually until reaction, as indicated by rapid rise of temperature, took place. The initial reaction temperature was 1500° F., the final reaction temperature was 1620° F., the average pressure was 15 p.s.i.a., and the reaction time was 28 hours. The total amount of sodium added incrementally throughout the reaction was 204 parts. Only traces of cesium were recovered.

EXAMPLE IX

The procedure of Example I was repeated, using a charge of 50 parts of pollucite ore and 10 parts of carbon (instead of sodium) as the reducing material. The initial reaction temperature was 965° F., the final reaction temperature was 1770° F., the average reaction pressure was 15 p.s.i.a., and the reaction time was 7.0 hours. No cesium was recovered.

EXAMPLE X

The procedure of Example I was repeated except that the ground pollucite ore was not calcined. Only traces of cesium were recovered.

The results of the above experiments are summarized in the following table:

TABLE

| Example | Charge, parts | | | Reaction Temperature, °F. | | Reaction Pressure, p.s.i.a. | Reaction Time, hours | Cesium Recovered | |
|---|---|---|---|---|---|---|---|---|---|
| | Pollucite | Sodium | Carbon | Initial | Final | | | Parts | Percent |
| I | 112.5 | 58 | | 1,225 | 1,630 | 15 | 10.0 | 22.58 | 80.3 |
| II | 112.5 | 58 | | 990 | 1,595 | 15 | 12.5 | 26.37 | 93.5 |
| III[a] | 150 | 75 | | 1,255 | 1,580 | 15 | 11.0 | 22.3 | 59.4 |
| IV | 112.5 | 58 | | 630 | 1,610 | 7 | 9.75 | 25.9 | 92.0 |
| V | 112.5 | 58 | | 500 | 1,400 | 1 | 5.0 | 22.5 | 80.0 |
| VI | 150 | [b]129 | | 1,100 | 1,520 | 15 | 9.5 | 40.7 | 82.5 |
| VII[c] | 50 | 28 | | 1,445 | 1,545 | 15 | 6.0 | 6.05 | 47.8 |
| VIII[d] | 462.5 | 204 | | 1,500 | 1,620 | 15 | 28 | Trace | Trace |
| IX[e] | 50 | | 10 | 965 | 1,770 | 15 | 7.0 | 0 | 0 |
| X[f] | 112.5 | 58 | | 1,225 | 1,630 | 15 | 10.0 | Trace | Trace |

(a) Distillate collected at a 20:1 reflux ratio.
(b) 75 parts fresh sodium plus 54 parts of sodium as recycle.
(c) Incremental pollucite feed.
(d) Incremental sodium feed.
(e) Carbon instead of sodium as reducing material.
(f) Pollucite ore ground but not calcined.

Since many different embodiments of the invention may be made without departing from the spirit and scope thereof, it is to be understood that the invention is not necessarily limited to the specific examples given above, and it is desired that only such limitations be imposed on the appended claims as are stated therein.

What is claimed is:

1. A process for recovering cesium values from pollucite ore which comprises the steps of (1) grinding the ore, (2) calcining the ore, (3) reacting the ground, calcined ore with an excess of alkali metal selected from the group consisting of sodium, potassium, lithium, and rubidium at a temperature above the boiling point of cesium and below the boiling point of the alkali metal, and (4) recovering a cesium-alkali metal product mixture.

2. The process of claim 1 wherein said pollucite ore is ground to an average particle size of about 100 to 200 mesh and is calcined at a temperature between about 1200° and 1700° F.

3. The process of claim 1 wherein said cesium-alkali metal product mixture is heated at an elevated temperature to distill cesium therefrom and said cesium is recovered.

4. The process of claim 1 wherein said alkali metal is sodium.

5. The process of claim 1 wherein the reaction temperature is between about 1230° and 1630° F.

6. The process of claim 1 wherein the ground, calcined ore is mixed with the alkali metal at room temperature before the mixture is heated to the reaction temperature.

7. A process for recovering cesium values from pollucite ore which comprises the steps of (1) grinding said pollucite ore to an average particle size of about 100 to 200 mesh, (2) calcining the ground ore at about 1200° to 1700° F., (3) reacting the ground, calcined ore with an excess of sodium at a temperature within the range of about 1230° and 1630° F., (4) separating from the resulting reaction mixture a cesium-sodium product mixture, and (5) heating said product mixture at an elevated temperature to distill cesium therefrom.

8. The process of claim 7 wherein the cesium-sodium product mixture is separated from the reaction mixture as fast as said product is formed, thereby minimizing contact between the cesium-sodium mixture and the pollucite ore.

9. A process for recovering cesium values from pollucite ore which comprises the steps of (1) grinding said pollucite ore to an average particle size of about 100 to 200 mesh, (2) calcining the ground ore at about 1200° to 1700° F., (3) reacting the ground, calcined ore with an excess of sodium at a temperature within the range of about 1230° and 1630° F., (4) separating from the resulting reaction mixture a cesium-sodium product mixture, and (5) separating from said product mixture a liquid phase and a solid phase, said liquid phase containing about 75 to 95 percent by weight of cesium.

10. The process of claim 9 wherein said liquid phase is heated at an elevated temperature to distill cesium overhead.

11. The process of claim 9 wherein said solid phase is recycled to the reactor.

12. A process for recovering cesium values from pollucite ore which comprises calcining the ore to remove moisture, forming a reaction mixture of the ground, calcined ore and an alkali metal selected from the group consisting of sodium and potassium and heating said reaction mixture to a temperature sufficient to reduce cesium from pollucite in an inert atmosphere and recovering the reduced cesium by heating the reaction mixture to a temperature at which cesium distills and distilling the cesium from said reaction mixture.

13. Process for separating cesium values from cesium ores comprising; admixing cesium-bearing ore and a metal selected from the group consisting of elemental sodium, potassium and mixtures thereof, to produce a mechanical mixture of said ore and said metal, maintaining such mechanical mixture at such a temperature that a vapor mixture of cesium and said metal is expelled from said mechanical mixture, condensing said vapor mixture to produce an alloy of cesium and said metal.

14. Process for separating cesium values from cesium ores comprising; admixing from about one part of cesium-bearing silicate ore to 1 to 4 parts of a metal selected from the group consisting of elemtntal sodium, potassium and mixtures thereof, to produce a mechanical mixture of said ore and said metal, maintaining said mechanical mixture at a temperature that a cesium alloy vapor mixture of cesium and said metal is expelled from said mechanical mixture, and condensing said vapor mixture to produce an alloy of cesium and said metal.

15. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 1230° to 1630° F., whereby a vapor mixture of cesium and said metal is expelled from said mechanical mixture, and condensing said vapor mixture to produce an alloy of cesium and said metal by contacting said vapor mixture with a cool surface.

16. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 1230° to 1630° F., whereby a vapor mixture of cesium and said metal is expelled from said mechanical mixture, condensing said vapor mixture to produce an alloy of cesium and said metal, and separating said cesium from said alloy.

17. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 1230° to 1630° F. whereby a vapor mixture of cesium and said metal is expelled from said mechanical mixture, and condensing said vapor mixture to produce an alloy of cesium and said metal.

18. Process for separating cesium values from cesium ores comprising; admixing cesium-bearing silicate ore and a metal selected from the group consisting of solid elemental sodium, potassium and mixtures thereof, to produce a mechanical mixture of said ore and said metal, heating said mechanical mixture to a temperature of from about 1382° to 1562° F. whereby a vapor mixture of cesium and said metal is expelled from said mechanical mixture, and condensing said vapor mixture to produce an alloy of cesium and said metal.

19. Process for separating cesium values from pollucite ores comprising; admixing pollucite ore and a metal selected from the group consisting of elemental sodium, potassium and mixtures thereof, to produce a mechanical mixture of said ore and said metal, maintaining said mechanical mixture at a temperature of from about 1382° to 1562° F. whereby a vapor mixture of cesium and said metal is expelled from said mechanical mixture, and condensing said vapor mixture to produce an alloy of cesium and said metal.

References Cited

UNITED STATES PATENTS

| | | | |
|---|---|---|---|
| 3,130,010 | 4/1964 | Moolenaar et al. | 75—66 X |
| 2,201,229 | 8/1965 | Blue et al. | 75—66 |
| 709,489 | 9/1902 | Jaubert | 75—135 |
| 2,480,655 | 8/1949 | Jackson | 75—66 |
| 2,924,511 | 2/1960 | Reintjes | 75—66 |
| 3,207,598 | 9/1965 | Berthold | 75—66 X |

FOREIGN PATENTS

| | | |
|---|---|---|
| 590,274 | 7/1947 | Great Britain. |
| 134,680 | 10/1929 | Switzerland. |

OTHER REFERENCES

Metals Reference Bok, 2nd ed., Co. J. Smithells, Interscience Publishers Inc., N.Y., 1955. vol. 1, page 249.

Hackspill et al.: "Direct Preparation of Metallic Cesium From Swedish Pollucite," Acadamie des Sciences Comptes Rendus, vol. 230, 1950, pages 1119–1121.

HYLAND BIZOT, *Primary Examiner.*

WINSTON A. DOUGLAS, DAVID L. RECK, BENJAMIN HENKIN, *Examiners.*

W. C. TOWNSEND, H. W. CUMMINGS, H. W. TARRING, *Assistant Examiners.*